Dec. 6, 1960

A. N. ORMOND 2,962,893

LOAD MEASURING DEVICE

Filed Oct. 24, 1957

INVENTOR.
ALFRED N. ORMOND
BY *Elliott & Pastoriza*
ATTORNEYS

United States Patent Office 2,962,893
Patented Dec. 6, 1960

2,962,893

LOAD MEASURING DEVICE

Alfred N. Ormond, 9107 5th Ave., Inglewood, Calif.

Filed Oct. 24, 1957, Ser. No. 692,120

1 Claim. (Cl. 73—141)

This invention relates generally to devices for measuring loads and more particularly to an improved cell for measuring relatively heavy structural loads and forces as encountered in the testing of materials, components and structures.

One of the more useful devices for measuring loads or forces is the load ring which is not only simple but extremely versatile in adaptation, portable in use, extremely rugged, and relatively accurate. The load ring basically comprises a circular ring of high quality metal to which loads or forces to be measured are applied at diametrically opposite ends to distort the ring into an elliptical shape. The distortion is always well within the elastic limit of the ring and its degree serves as an indication of the applied load. To increase the sensitivity of the device, it is possible to provide wands or small rods secured to the inside periphery of the ring and extending in a general radial direction inwardly whereby the distortion of the ring is mechanically amplified by motion of the end of the wand. Suitable mechanical linkages may be secured directly to the wands and coupled to a pointer for indicating the load on a calibrated scale. Alternatively, electrical transducers may be employed for converting the physical motion of the wands or of the load ring itself into electrical quantities which will indicate the degree of distortion and thus the applied load.

It is a primary object of the present invention to provide a novel type of load cell which is lighter in weight than a conventional load ring of equal capabilities.

Another object is to provide a load cell of the above type which for a given load is stressed less than a conventional load ring whereby the range of the load cell may be increased and still remain within its elastic limit.

Still another object is to provide a load cell of the above type which provides a greater deflection than presently known rings of equal strength and weight whereby greater accuracy and sensitivity is realizable.

These and many other objects and advantages of the present invention are attained by providing a continuous closed member of non-circular configuration as opposed to the known conventional circular type. Preferably, the non-circular configuration takes the form of a rhombus. Suitable wand means are secured to opposite portions of the non-circular member and extend inwardly to connect to suitable indicating means in a conventional manner. Loads or forces to be measured are applied to diagonally opposite corners of the rhombus or other non-circular shape.

With this type of structural arrangement for the load cell, it has been found that increased advantages are had with respect to weight, degree of stressing, and degree of deflection as compared to presently known load rings.

A better understanding of the improved load cell of this invention will be had by referring to a preferred embodiment thereof as illustrated in the accompanying drawings, in which.

Figure 1:
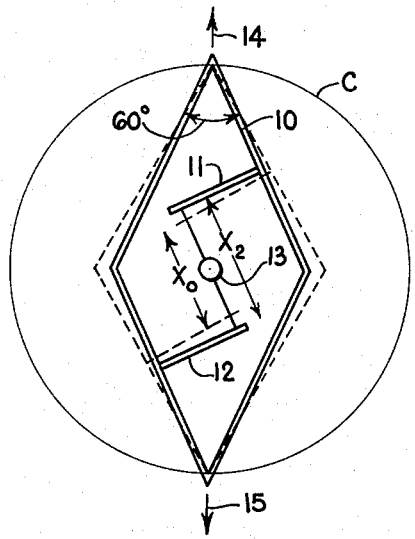
Figure 1 is a schematic representation of the improved load cell of this invention under the influence of a tension force.

Referring first to Figure 1, there is illustrated a continuous closed member 10 in the shape of a rhombus. Suitable sensing elements in the form of wands 11 and 12 are rigidly secured to opposite sides of the rhombus 10 and extend inwardly as shown. A means for indicating relative movement of the wands 11 and 12 is positioned between the wands as indicated schematically at 13.

While the non-circular shape of the continuous closed structural member 10 is in the form of a rhombus, it is to be understood that other non-circular shapes could be used and still result in advantages over the conventional circularly shaped load ring. The increased advantages are realizable provided that the positions of connection of the wands to the member is such that they fall within an imaginary circle C diametrically passing through the opposite points to which the load or force to be measured is applied. Preferably, the non-circular shape employed is symmetrical with respect to a vertical axis passing through the points at which the load is applied.

Figure 2:
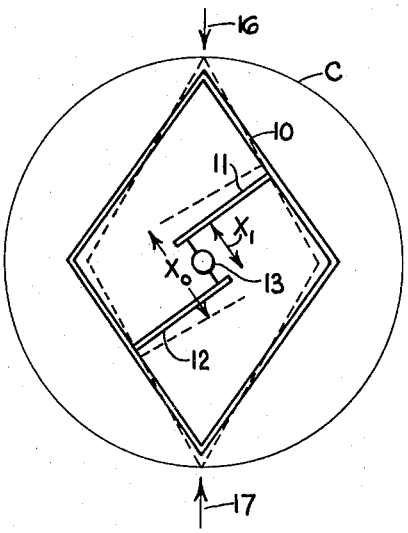
Figure 2 is a view similar to Figure 1 illustrtating the load cell under a compression load or force.

In both Figures 1 and 2, the preferred embodiment of the rhombus 10 has a neutral or undistorted position as indicated by the dotted lines. In Figure 1, the rhombus 10 is shown distorted in a vertical direction as would result from the application of a tension force as indicated by the arrows 14 and 15. The actual distortion is greatly exaggerated in Figure 1 for purposes of clarity. As shown, the separation of the wands 11 and 12 in the unstrained or neutral position, as indicated in dotted lines, may be designated $X_0$. Upon application of the tension forces 14 and 15 to diagonally opposite points, the rhombus is distorted to the solid line position and the wands 11 and 12 are then separated by a distance designated $X_2$.

In Figure 2, the distortion resulting from compression forces as indicated by the arrows 16 and 17 is illustrated. As shown, the separation distance between the end portions of the wands 11 and 12 is decreased to a value $X_1$ from the neutral separation distance of $X_0$. The indicator 13 simply serves to transform the physical movements of the wands into some type of indication proportional to the load applied to the cell.

Figure 3:
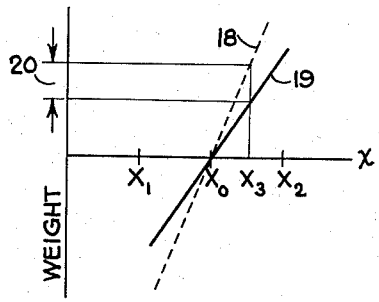
Figure 3 is a qualitative graph illustrating the weight advantage realized by the load cell of this invention over conventional load rings.

Referring now to Figure 3, the advantages of the non-circular or rhombic shape of the load cell 10 as compared to a conventional circular type load ring such as would correspond to the circle C in Figures 1 and 2 will be evident. In Figure 3, there is shown a plot of the deflection X as a consequence of application of unit loads to both a conventional circular type load ring and to the rhombic cell 10 of Figures 1 and 2. The deflection of the circular load ring is indicated by the dash line 18 and the deflection of the improved rhombic load cell of Figures 1 and 2 indicated by the solid line 19. The ordinates in the plots of Figure 3 represents the weights of different types of both circular load rings and rhombic load cells. Accordingly, at some fixed load value as represented by a deflection at $X_3$, it will be noted that the circular load ring will weigh or be of a greater mass than the corresponding rhombic load cell. In fact, for a given deflection or load $X_3$, the rhombic load cell will provide an identical indication as that of a load ring which is heavier by an amount indicated at 20. In a specific calculation for a rhombic load cell having an interior acute angle of 60°, it was found that per unit of load and for equal strength and equal deflections, the weight of the circular load ring was greater than the rhombic load cell by a factor of 1.86.

Figure 4:
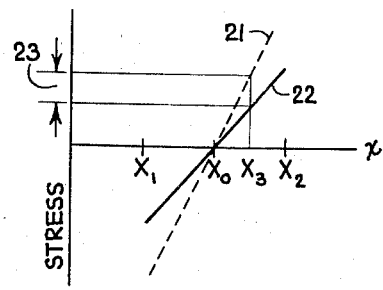
Figure 4 is another graph similar to Figure 3 illustrating the stress advantages realizable in the load cell of the present invention as compared to presently known load rings; and, Figure 5 is another graph illustrating the deflection characteristics of the load cell of the instant invention as compared to prior art load rings.

Referring now to the plot of Figure 4, there is illustrated a dash line 21 for a conventional type load ring and a solid line 22 for the rhombic load cell of Figures 1 and 2. In this instance, the ordinates represent units of stress. It will be evident from Figure 4 that for equal loads and equal deflections, the circular load cell is stressed to a greater degree than the rhombic load cell as indicated by the difference 23. In a specific calculation, it was found that per unit of load and for equal strengths and equal deflections, the stress of the circular load ring was higher than that of the rhombic load cell having an interior acute angle of 60° by a factor of 1.37.

Figure 5:
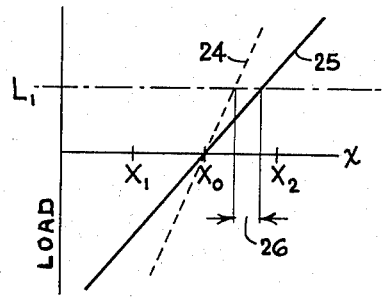

Referring now to Figure 5, there is again illustrated a dashed line 24 for a conventional load ring and the solid line curve 25 for the rhombic load cell of Figures 1 and 2. In this case, the ordinates represent different loads and on rings of equal strength and equal weight, it is found that the deflection of the circular load ring is less than for the rhombic load cell. For example, at a specific loading or force as indicated by the dot-dash line $L_1$, the deflection of the rhombic load cell is illustrated as greater than the corresponding deflection of the conventional load ring, the difference being indicated at 26. In a specific calculation, it was found that per unit of load and for equal strength and equal weight, the deflection of the circular load ring was less than that for the rhombic load cell having an interior angle of 60° by a factor of .538.

From the foregoing, it will be evident that the present invention provides greatly improved load measuring devices which may be made not only lighter and subject to less stress than presently known devices, but which may also provide a larger deflection whereby more sensitivity and greater accuracy is realizable.

Modifications of the load cell that fall within the scope and spirit of the present invention will occur to those skilled in the art. The invention therefore is not to be thought of as limited specifically to the one preferred embodiment chosen for illustrative purposes.

What is claimed is:

A load measuring device comprising: an integral closed member having solely four distortable rectilinear portions forming a rhombus; a pair of wands extending in the plane of said rhombus from opposite rectilinear portions of said rhombus and spaced corresponding distances from the opposite points thereof to which said load is applied; and indicating means coupled to the free end portions of said wands responsive to a change in the relative spacing between said wands for indicating a quantity proportional to the load applied to said device.

References Cited in the file of this patent

UNITED STATES PATENTS

| | | |
|---|---|---|
| 1,647,272 | Chatillon | Nov. 1, 1927 |
| 2,520,923 | Franzel et al. | Sept. 5, 1950 |
| 2,600,701 | Statham et al. | June 17, 1952 |
| 2,611,266 | Wiancko | Sept. 23, 1952 |